(12) United States Patent
Bocksrocker et al.

(10) Patent No.: US 12,722,231 B2
(45) Date of Patent: Sep. 1, 2026

(54) MULTI-STAGE LASER STRIPPING OF A ROD-SHAPED CONDUCTOR

(71) Applicant: TRUMPF LASER—UND SYSTEMTECHNIK GMBH, Ditzingen (DE)

(72) Inventors: Oliver Bocksrocker, Sachsenheim (DE); Christoph Neugebauer, Kirchheim unter Teck (DE); Tim Hesse, Ditzingen (DE)

(73) Assignee: TRUMPF LASER- UND SYSTEMTECHNIK GMBH, Ditzingen (DE)

(*) Notice: Subject to any disclaimer, the term of this patent is extended or adjusted under 35 U.S.C. 154(b) by 826 days.

(21) Appl. No.: 18/187,695

(22) Filed: Mar. 22, 2023

(65) Prior Publication Data

US 2023/0219170 A1 Jul. 13, 2023

Related U.S. Application Data

(63) Continuation of application No. PCT/EP2021/075304, filed on Sep. 15, 2021.

(30) Foreign Application Priority Data

Sep. 25, 2020 (DE) ..................... 10 2020 212 087.0

(51) Int. Cl.
*B23K 26/38* (2014.01)
*B23K 26/402* (2014.01)
(Continued)

(52) U.S. Cl.
CPC ............ *B23K 26/38* (2013.01); *B23K 26/402* (2013.01); *B23K 2101/38* (2018.08); *B23K 2103/172* (2018.08)

(58) Field of Classification Search
CPC .. B23K 26/38; B23K 26/402; B23K 2101/38; B23K 2103/172; B23K 26/0622;
(Continued)

(56) References Cited

U.S. PATENT DOCUMENTS

| | | | | |
|---|---|---|---|---|
| 6,640,436 | B1 | 11/2003 | Kimura et al. | |
| 2005/0265678 | A1* | 12/2005 | Manyam ............ | G02B 6/03611 385/127 |

(Continued)

FOREIGN PATENT DOCUMENTS

| | | | |
|---|---|---|---|
| JP | 2007068343 | A | 3/2007 |
| WO | WO 2018092022 | A1 | 5/2018 |
| WO | WO 2019002847 | A1 | 1/2019 |

OTHER PUBLICATIONS

Topag Lasertechnik Gmbh: "For 25 years Lasertechnology for Your Innovation Newsletter | Dec. 2019 Top Hat Beam Shaper FBS-L", Dec. 2019, pp. 1-2, Retrieved from the Internet URL:https://www.topag.de/media/newsletter/2019/TOPAG%20Newsletter%20December%202019.pdf.

*Primary Examiner* — Robert G Bachner
(74) *Attorney, Agent, or Firm* — LEYDIG, VOIT & MAYER, LTD.

(57) ABSTRACT

A method for stripping a rod-shaped conductor using laser radiation is provided. The rod-shaped conductor includes an electrically conductive core and a coating that is at least partially transparent to the laser radiation. The method includes traversing the conductor for a first time with at least one laser beam to at least partially reduce transparency of the coating, and traversing the conductor for a second time with the at least one laser beam to at least partially reduce adhesion of the coating.

19 Claims, 5 Drawing Sheets

(51) Int. Cl.
*B23K 101/38* (2006.01)
*B23K 103/16* (2006.01)

(58) Field of Classification Search
CPC B23K 26/08; B23K 2103/10; B23K 2103/12; B23K 2103/42; B23K 26/22; B23K 26/32; B23K 26/362; H02K 15/35; H02K 15/0421
See application file for complete search history.

(56) References Cited

U.S. PATENT DOCUMENTS

2011/0148002 A1* 6/2011 Kakui .................... B23K 26/40 264/400
2016/0161672 A1 6/2016 Bauco et al.
2019/0280574 A1* 9/2019 Shirai ................ B23K 26/0622
2020/0106347 A1 4/2020 Shirai et al.

* cited by examiner

MULTI-STAGE LASER STRIPPING OF A ROD-SHAPED CONDUCTOR

CROSS REFERENCE TO RELATED APPLICATIONS

This application is a continuation of International Application No. PCT/EP2021/075304 (WO 2022/063649 A1), filed on Sep. 15, 2021, and claims benefit to German Patent Application No. DE 10 2020 212 087.0 A1, filed on Sep. 25, 2020. The aforementioned applications are hereby incorporated by reference herein.

FIELD

Embodiments of the present invention relate to a method for stripping a rod-shaped conductor. Embodiments of the present invention also relate to a method for producing a hairpin having at least one such stripped rod-shaped conductor.

BACKGROUND

The practice of stripping a rod-shaped conductor by immersing the latter in an acid bath is known.

The treatment of workpieces by laser radiation is also known. However, since high-energy laser radiation is often produced in the infrared range, especially in the near infrared range, and coatings are generally transparent to such laser radiation, it has not been possible to date to implement an efficient removal of such a coating using laser radiation.

SUMMARY

Embodiments of the present invention provide a method for stripping a rod-shaped conductor using laser radiation. The rod-shaped conductor includes an electrically conductive core and a coating that is at least partially transparent to the laser radiation. The method includes traversing the conductor for a first time with at least one laser beam to at least partially reduce transparency of the coating, and traversing the conductor for a second time with the at least one laser beam to at least partially reduce adhesion of the coating.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
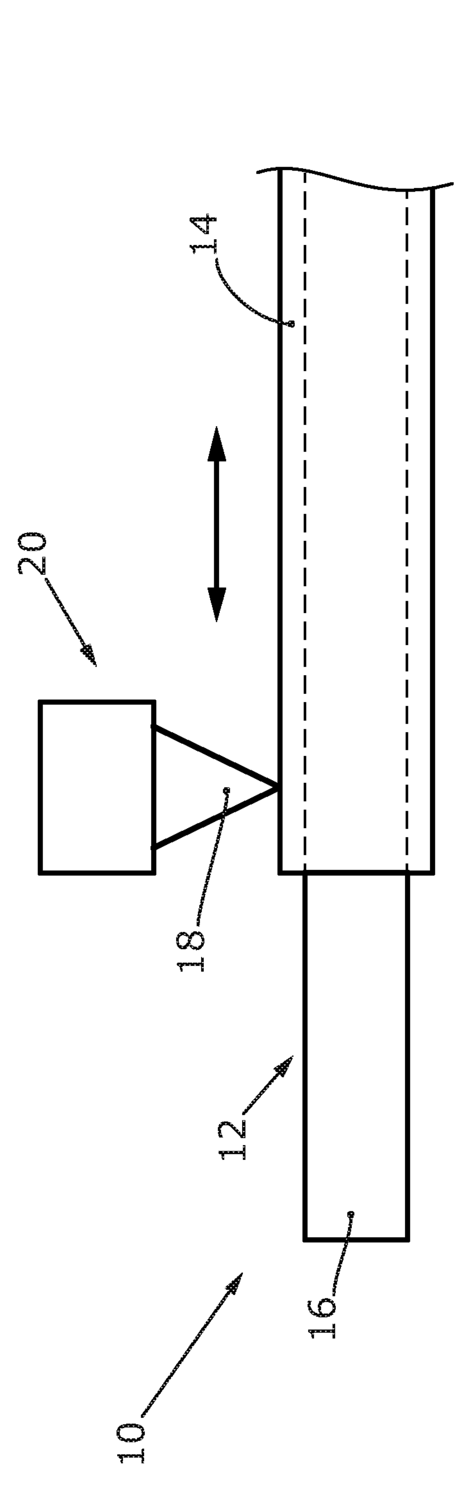
FIG. 1 shows a schematic side view of a rod-shaped conductor and a laser for at least a sectional removal of an electrically insulating coating of the rod-shaped conductor according to some embodiments.

Embodiments of the invention provide a method for stripping a rod-shaped conductor which is implementable quickly, reproducibly and without wet chemistry. Embodiments of the invention also provide a method for producing a hairpin using at least one such at least partially stripped rod-shaped conductor.

According to some embodiments, a rod-shaped conductor with an electrically conductive core and an at least partially transparent coating is stripped at least in sections. In so doing, the region to be stripped is traversed at least twice using a laser beam: the first time to at least reduce the transparency of the coating in the region to be stripped and the second time to at least partially remove the coating. In this case, stripping can be very effective during the second traversal since the laser radiation is at least partially absorbed by the coating, hence enabling an energy input into the said coating.

Embodiments of the present invention provide a multi-stage process for removing a coating from a conductive core of a conductor, wherein

- the coating is damaged in the first process step so that the transparency is partially or entirely lost; and
- at least one layer of the coating is modified by means of laser radiation in at least one second process step, to the effect of lifting the adhesion of the coating in full or virtually in full, as a result of which a successive ablation is implemented.

Consequently, an at least partially transparent coating is influenced in such a way that the laser radiation is absorbed and the coating can be ablated.

Temporally successive, multiple irradiations of the same surface section, for example in the form of a pulse overlap, is already considered to be the second traversal in this case.

Should nothing else be specified, the following parameters of the laser radiation relate to the at least one laser beam during the first traversal and/or to the at least one laser beam during the second traversal.

The conductive core preferably contains aluminium and/or copper.

In a particularly preferred embodiment of the invention, the conductor is embodied in the form of a hairpin conductor. The term “hairpin” is explained in more detail below:

In order to form stators in electric motors, it is known to provide a stator cage formed from an insulating material, so-called hairpins composed of an electrically conductive material, preferably copper, being introduced into said stator cage. By way of example, the hairpins may have a clip-like or linear embodiment. After having been introduced into the stator cage, the hairpin conductors are present parallel to one another and substantially in the axial direction of the stator or of the electric motor in the stator cage. Around the periphery of the stator cage a multiplicity of such hairpin conductors are introduced into the stator cage, said hairpin conductors initially not being mechanically and electrically connected to one another during mounting or manufacture. After having been introduced into the stator cage and after possible reshaping and/or shortening and a possible pre-treatment, for example stripping, the respective free ends of the hairpin conductors are then joined together preferably in pairs to form a complete stator winding, for example by welding. The joining process produces both a mechanical connection and an electrically conductive connection between the free ends of the respective hairpins, such that the hairpin conductors initially present individually after having been introduced are now connected. The joining of the hairpin conductors makes it possible to form a mechanically and electrically interconnected, continuous stator winding.

The hairpins usually have a square or rectangular cross section, the cross-sectional area of which is substantially larger than that of a wire formed for winding. As a result, an increased current flow is enabled vis-à-vis a wire. The increase in performance of electric motors achievable therewith is advantageous, especially in the case of electric motors for motor vehicles, as these must meet very high demands in relation to performance.

In a further preferred embodiment of the invention, the radial outer side of the conductor is irradiated by a plurality of non-congruent laser beams during the first traversal and/or during the second traversal. The laser beams preferably have a work angle of 3° to 15° with respect to one another and/or are laterally offset from one another.

Further preferably, the radial outer side of the conductor is stripped in its entirety. This significantly simplifies the subsequent connection of the conductor to a further conductor.

The conductor can be rotated, in particular about its longitudinal axis, during the irradiation of the coating in order to obtain a uniform removal of the said coating.

Laser radiation in the infrared range, in particular having a wavelength of 10 600 nm or 5000 nm, is preferably used for stripping. For stripping, use can be made, in particular, of laser radiation in the near infrared range having a wavelength between 800 nm and 1200 nm, in particular 960 nm, 1030 nm, 1060 nm, 1064 nm or 1070 nm.

The beam quality $M^2$ of the laser radiation is preferably less than or equal to 4, in particular between 1 and 1.4, preferably in the case of a Gaussian intensity profile. As an alternative or in addition, use can be made of a multi-mode laser with a top hat-shaped intensity profile. This can implement particularly effective stripping.

The coating may contain polyamidimide (PAI), polyetheretherketone (PEEK), and/or polyamidimide with polyimide film (PAI+FEP).

The coating may have a plurality of layers, in particular a plurality of different layers. By way of example, the coating may have one layer made of polyamidimide and a further layer made of polyetherketone.

The laser radiation preferably has a Gaussian intensity profile or a round or preferably square/rectangular top hat-shaped intensity profile.

In this context, the beam cross section of the laser radiation preferably has the top hat-shaped intensity profile along its long extent and the Gaussian intensity profile along its short extent.

Further preferably, the beam cross section of the laser radiation may have a 1.1-times to 10-times greater extent along its long extent than along its short extent.

To strip a region of the coating, this region is preferably hatched, that is to say traversed line-by-line, with the laser radiation.

In this case, the longitudinal ends of the hatched region can be irradiated using at least one single line transversely to the longitudinal extent of the conductor, in order to precisely delimit the stripped region.

The laser radiation has the following parameters during the first traversal:

- a fluence of at least 1 $J/cm^2$ and at most 40 $J/cm^2$; and
- a continuous laser beam or a repetition rate of at least 1 kHz and at most 4 MHz.

As an alternative or in addition, the laser radiation may have the following parameters during the second traversal:

- a fluence of at least 1 $J/cm^2$ and at most 40 $J/cm^2$; and
- a positive pulse overlap.

Following the second traversal, the conductor may be traversed a third time in order to clean the section to be stripped of the conductor. Additionally, the conductor can be traversed any desired number of further times.

The coating can be removed by spalling and/or being burnt off. Spalling is preferably achieved by the use of the following parameters:

- a frequency of at least 5 kHz and at most 15 kHz; and
- a pulse overlap of less than 20%, in particular a negative pulse overlap of between −10% and −20%; and
- a line overlap of less than 20%; and
- a pulse energy of between 30 mJ and 50 mJ.

In the case of spalling, a negative pulse overlap, in particular between −10% and −20%, is preferably used during the first traversal; then, the residual grid in the form of small chips is ablated during the second traversal. Removal of residue can be obtained by an optional third traversal.

As an alternative or in addition thereto, burning off can be achieved by the use of the following parameters:

- a frequency of more than 20 kHz; and
- a pulse overlap of more than 40%; and
- a line overlap of more than 40%; and
- a pulse energy of more than 40 mJ.

In the case of burning off, there is preliminary damage (“carbonization”) to the coating during the first traversal and an ablation by being burnt off during the second traversal. An optional third traversal serves the cleaning of fouling.

The laser and system technology for carrying out the method according to embodiments of the invention includes the following variants in particular:

Variant 1: A laser and an optical unit for beam guidance and use of spot laser radiation;

Variant 2: A laser and an optical unit for beam guidance and use of multi-focal laser radiation;

Variant 3: More than one laser and an optical unit for beam guidance and use of spot laser radiation;

Variant 4: More than one laser and an optical unit for beam guidance and use of multi-focal laser radiation;

Variant 5: More than one laser and more than one optical unit for beam guidance and use of multi-focal laser radiation.

Embodiments of the present invention also provide a method for producing a hairpin having two rod-shaped hairpin conductors, with one or both of the rod-shaped hairpin conductors being stripped at least in sections using a method described herein. Preferably, both rod-shaped hairpin conductors are stripped at least in sections using the method described herein. Subsequently, the stripped conductive cores of the two rod-shaped hairpin conductors are welded to one another such that a hairpin is created. In this case, welding can be—preferably—carried out using the same laser used for stripping, or can be carried out using a different laser.

Further advantages of the invention are evident from the description and the drawing. Likewise, according to embodiments of the invention, the features mentioned above and those that will be explained still further can be used in each case individually by themselves or as a plurality in any desired combinations. The embodiments shown and described should not be understood as an exhaustive enumeration, but rather are of exemplary character for outlining the invention.

FIG. 1 shows a rod-shaped conductor 10 having an electrically conductive core 12 and an electrically insulating coating 14. The intention is to weld the rod-shaped conductor 10, at its bare free end 16, to a further rod-shaped conductor 10 (not shown in FIG. 1). To this end, it is necessary to remove the coating 14 from the free end 16. According to embodiments of the invention, this removal of the coating 14 is implemented by a laser beam 18 of a laser 20.

The conductive core 12 preferably contains aluminium and/or copper. The coating 14 preferably contains polyamidimide, polyetheretherketone, and/or polyamidimide with polyimide film. The coating 14 may have a transparency of more than 50%, more than 70%, or more than 90% to the wavelength(s) of the laser beam 18. The laser beam 18 preferably radiates laser radiation in the infrared range, preferably in the near infrared range, in particular at (a) wavelength(s) between 800 nm and 1200 nm. On account of the transparency of the coating 14 to the laser beam 18, the coating 14 is traversed multiple times according to embodiments of the invention. As a result, the transparency of the coating 14 is initially reduced and the coating 14 can subsequently absorb the energy of the laser beam 18 and can thus be removed, preferably by spalling or being burnt off.

Figure 2:
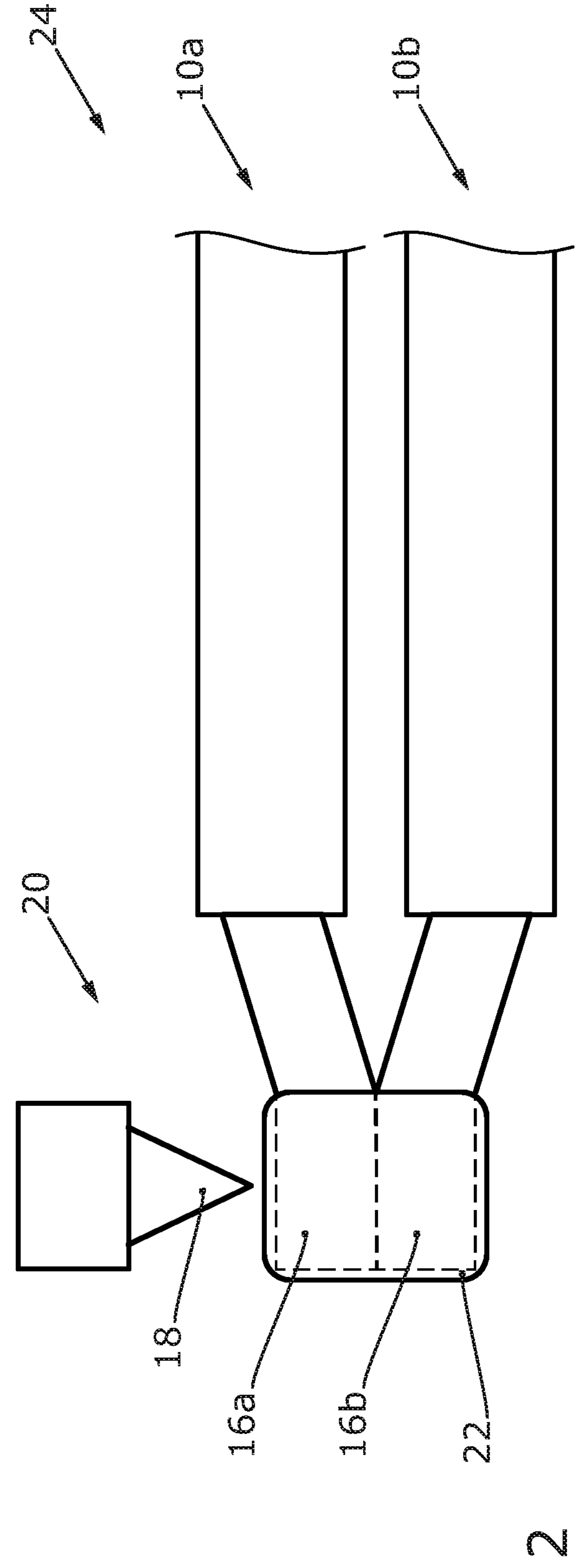
FIG. 2 shows a schematic side view of rod-shaped conductors which have been connected to form a hairpin, with the bare electrically conductive cores of the rod-shaped conductors having been welded using a laser, according to some embodiments.

FIG. 2 shows rod-shaped conductors 10*a*, 10*b*, the free ends 16*a*, 16*b* of which are welded to one another. In this case, a weld bead 22 is preferably formed at the free ends 16*a, b*. Welding is implemented using a laser beam 18 of a laser 20. The laser 20 can be the same laser 20 (see FIG. 1) used to strip the free ends 16*a, b*, or it can be a different laser 20. The rod-shaped conductors 10*a, b* are embodied in the form of hairpin conductors. The connected rod-shaped conductors 10*a, b* represent a hairpin 24.

Figures 3, 4:
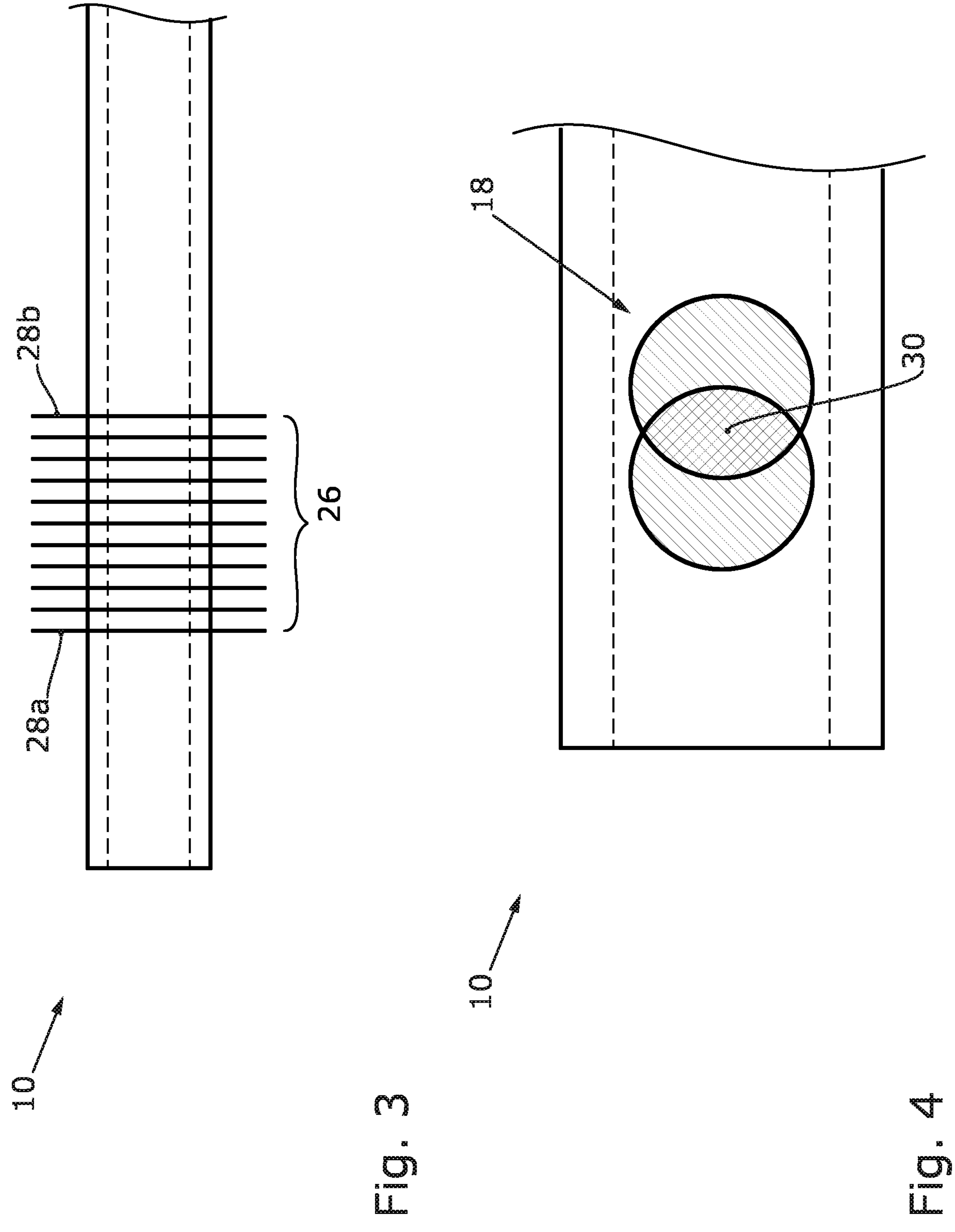
FIG. 3 shows a schematic plan view of a rod-shaped conductor, with a section of the rod-shaped conductor having been irradiated line-by-line using a laser in order to remove the coating of the rod-shaped conductor in this region, according to some embodiments.
FIG. 4 shows a schematic plan view of a rod-shaped conductor, it being evident from FIG. 4 that pulsed irradiation of the rod-shaped conductor using a laser has led to a two-time traversal of the rod-shaped conductor in the overlap region of the laser pulses, according to some embodiments.

FIG. 3 shows a rod-shaped conductor 10, the axial section 26 of which was stripped, that is to say laid bare. To this end, a laser beam 18 (see FIG. 1) is moved line-by-line in the region 26, as a result of which hatching arises. The region 26 is preferably precisely delimited on one side or two sides by way of (a) single line(s) 28*a*, 28*b*.

FIG. 4 shows a rod-shaped conductor 10 which is machined by a pulsed laser beam 18. It is evident from FIG. 4 that an overlap region 30 of the laser beam 18 is traversed twice.

Figure 5B:
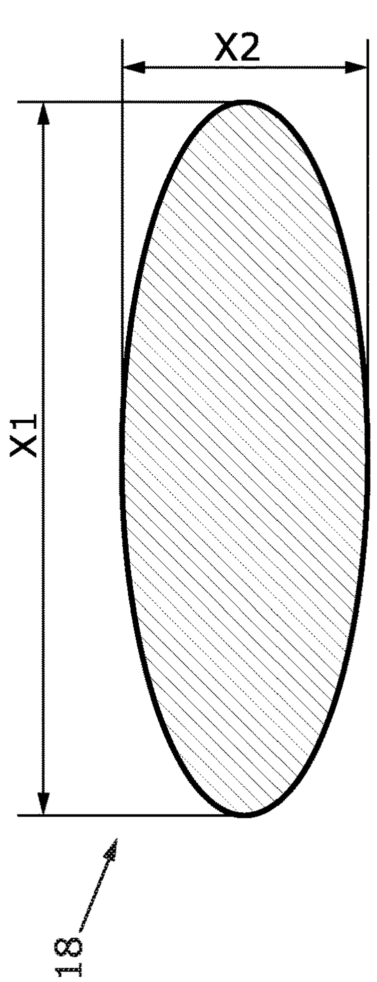
FIG. 5*b* shows a schematic elliptical irradiation region of a laser radiation on a rod-shaped conductor, according to some embodiments.
Figure 5D:
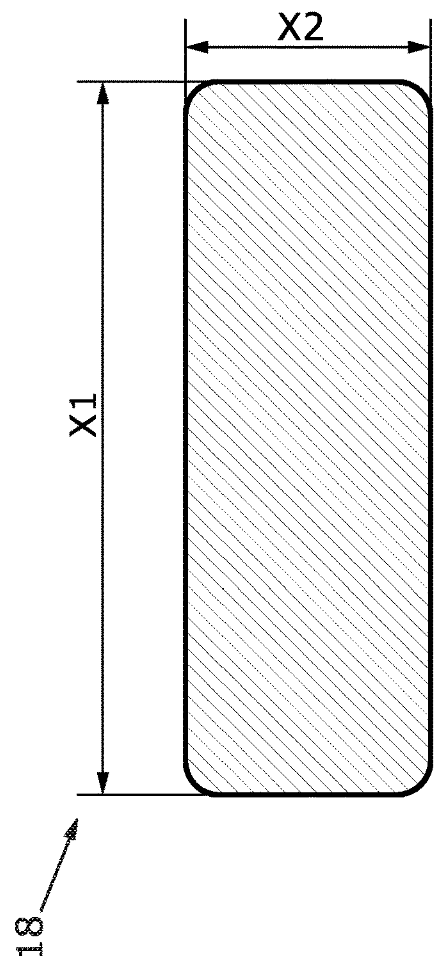
FIG. 5*d* shows a schematic rectangular irradiation region of a laser radiation on a rod-shaped conductor, according to some embodiments.
Figure 5A:
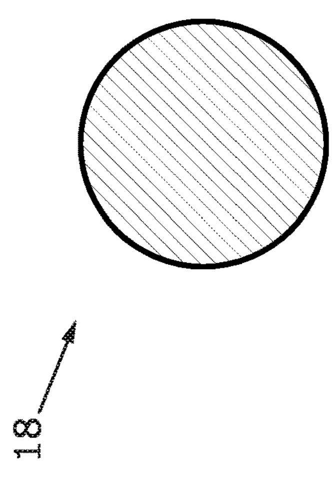
FIG. 5*a* shows a schematic circular irradiation region of a laser radiation on a rod-shaped conductor, according to some embodiments.

FIG. 5*a* shows a laser beam 18 with a circular beam cross section. The laser beam 18 preferably has a Gaussian intensity profile.

FIG. 5*b* shows a laser beam 18 with an elliptical beam cross section. The laser beam 18 preferably has a top hat-shaped intensity profile along its long extent X1 and a Gaussian intensity profile along its short extent X2.

Figure 5C:
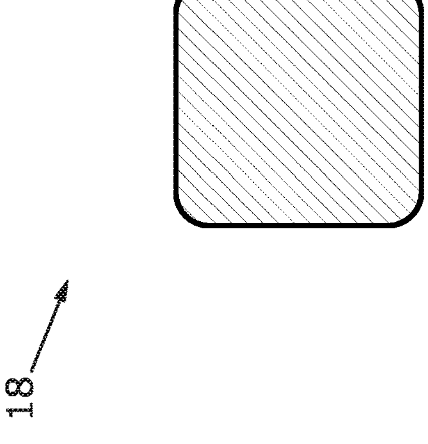
FIG. 5*c* shows a schematic square irradiation region of a laser radiation on a rod-shaped conductor, according to some embodiments.

FIG. 5*c* shows a laser beam 18 with a square beam cross section. The laser beam 18 preferably has a Gaussian intensity profile.

FIG. 5*d* shows a laser beam 18 with a rectangular beam cross section. The laser beam 18 preferably has a top hat-shaped intensity profile along its long extent X1 and a Gaussian intensity profile along its short extent X2.

Figure 6:
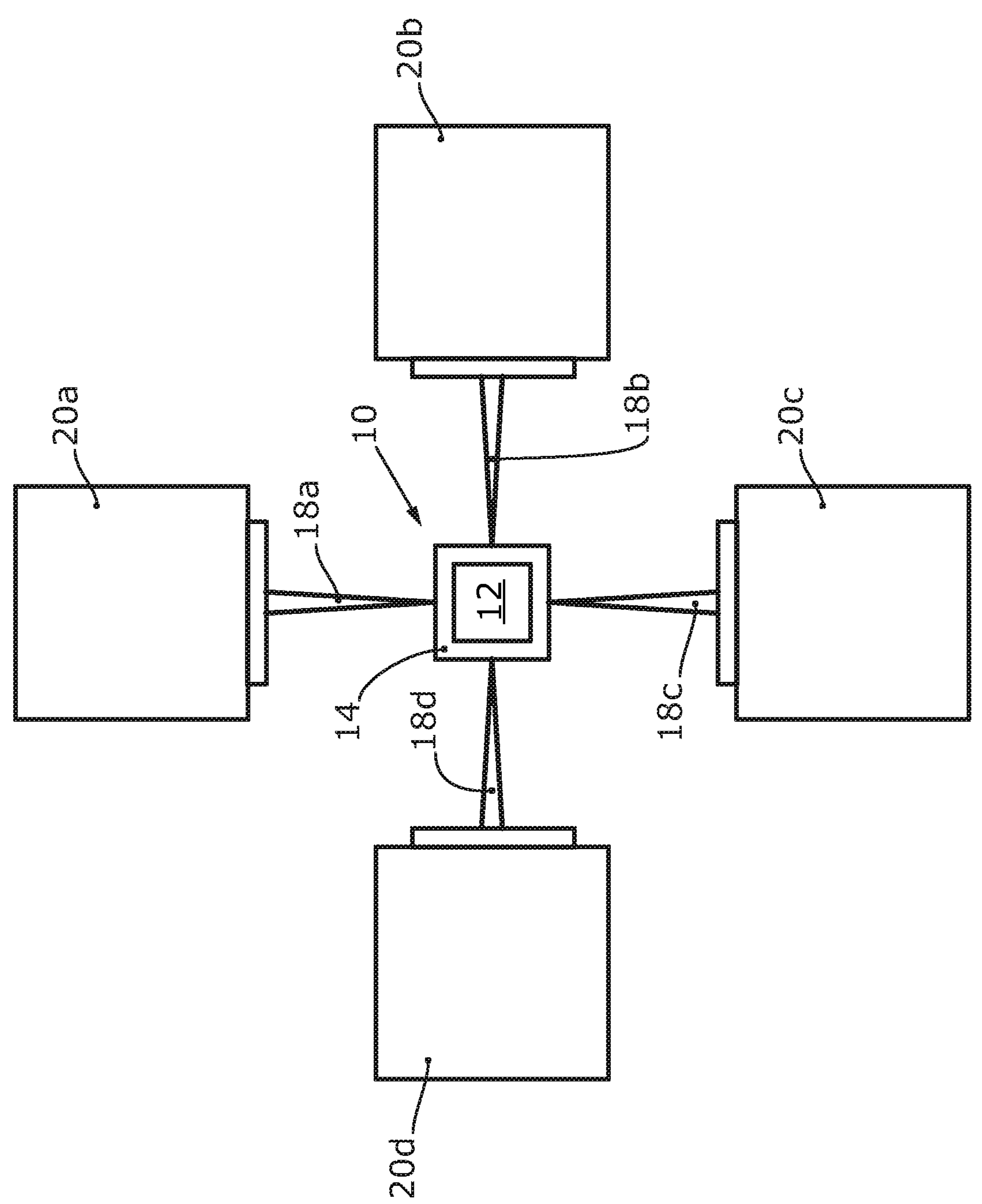
FIG. 6 schematically shows the irradiation of a rod-shaped conductor using four laser beams according to some embodiments.

FIG. 6 shows four lasers 20*a*, 20*b*, 20*c*, 20*d*, the laser beams 18*a*, 18*b*, 18*c*, 18*d* of which strip a rod-shaped conductor 10 radially all round, that is to say remove a coating 14 from the conductive core 12.

Figure 7:
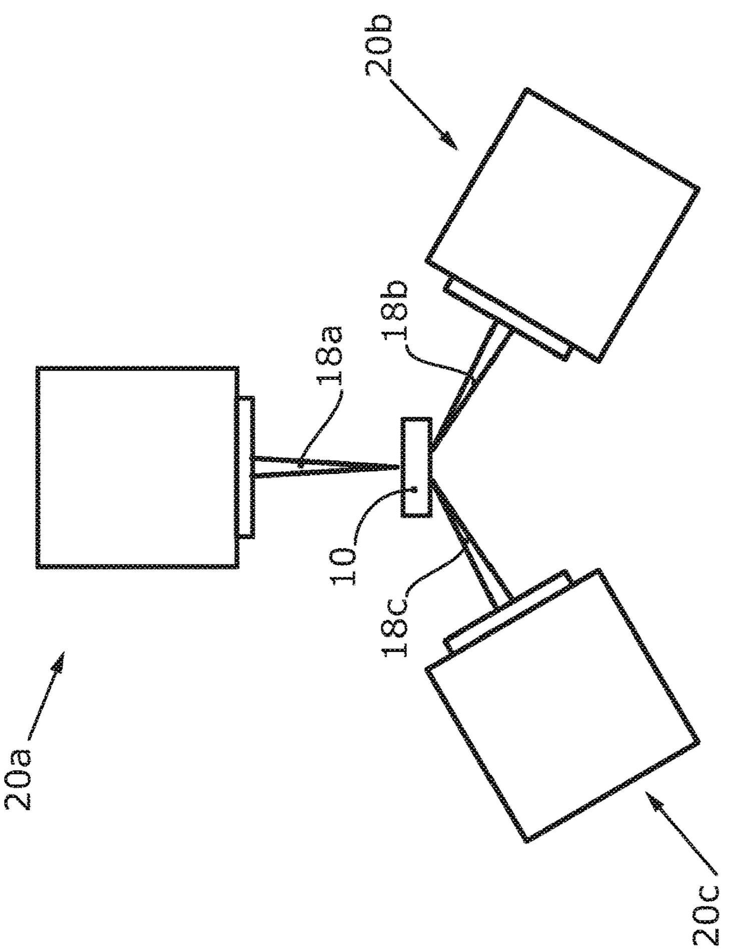
FIG. 7 schematically shows the irradiation of a rod-shaped conductor using three laser beams according to some embodiments.

In a manner similar thereto, FIG. 7 shows three lasers 20*a-c*, the laser beams 18*a-c* of which strip a rod-shaped conductor 10 radially all round.

Figure 8:
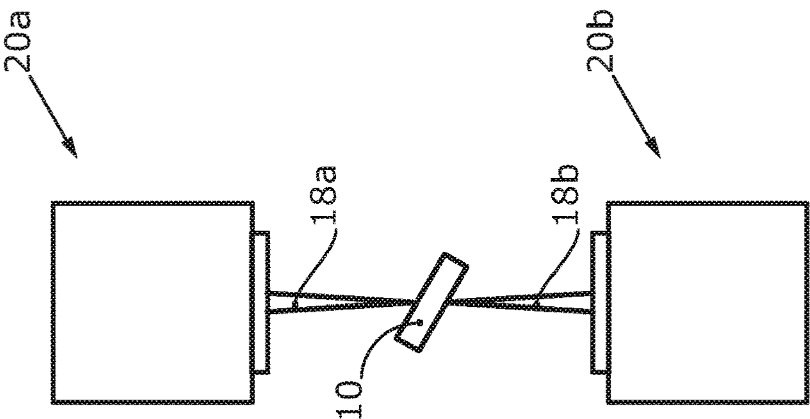
FIG. 8 schematically shows the irradiation of a rod-shaped conductor using two laser beams according to some embodiments.

In a manner similar thereto, FIG. 8 shows two lasers 20*a, b*, the laser beams 18*a, b* of which strip a rod-shaped conductor 10 radially all round.

In the case of a plurality of lasers 20*a-d* in accordance with FIGS. 6 to 8, it is preferable for the laser beams 18*a-d* of the lasers 20*a-d* to be incident on the surface of the conductor 10 at an angle of between 60° and 120°, that is to say as perpendicularly as possible, in order to ensure efficient machining. To obtain a uniform removal of the coating 14 (see FIG. 1), the conductor 10 can be rotated, in particular about its longitudinal axis, during the irradiation with the laser beams 18*a-d*.

Taking all the figures of the drawing jointly into consideration, embodiments of the invention relate to a method for removing an electrically non-conductive coating 14, in particular a plastic coating, from an electrically conductive core 12, in particular a metal core, of a conductor 10, 10*a, b*, in particular in the form of a wire. The conductor 10, 10*a,b* is preferably embodied in the form of a hairpin conductor. The coating 14 is removed by way of multiple irradiations of the coating 14 with laser radiation, in particular in the infrared range.

Embodiments of the invention also relate to a method for producing a hairpin 24 from two bare conductors 10, 10*a, b*.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10, 10*a, b* Rod-shaped conductor
12 Conductive core
14 Coating
16, 16*a, b* Free end
18, 18*a-d* Laser beam
20, 20*a-d* Laser
22 Weld bead
24 Hairpin
26 Region
28*a, b* Individual line
30 Overlap region
X1 Long extent of the beam cross section
X2 Short extent of the beam cross section

The invention claimed is:

1. A method for stripping a rod-shaped conductor using laser radiation, wherein the rod-shaped conductor comprises an electrically conductive core and a coating that is at least partially transparent to the laser radiation, the method comprising:
- traversing the conductor for a first time with at least one laser beam to at least partially reduce transparency of the coating; and
- traversing the conductor for a second time with the at least one laser beam to at least partially reduce adhesion of the coating,
- wherein the laser radiation has the following parameters in order to obtain at least partial spalling of the coating:
  - a frequency of at least 5 kHz and at most 15 kHz;
  - a pulse overlap of less than 20%;
  - a line overlap of less than 20%; and
  - a pulse energy of between 30 mJ and 50 mJ.

2. The method according to claim 1, wherein the conductor is in a form of a hairpin conductor.

3. The method according to claim 1, wherein the at least one laser beam comprises a plurality of non-congruent laser beams, and wherein a radial outer side of the conductor is irradiated by the plurality of non-congruent laser beams during the traversing for the first time and/or the traversing for the second time.

4. The method according to claim 1, wherein an entirety of the radial outer side of the conductor is stripped.

5. The method according to claim 1, wherein the laser radiation is in a near infrared range with a wavelength between 800 nm and 1200 nm.

6. The method according to claim 1, wherein the laser radiation has a beam quality $M^2$ that is less than or equal to 4.

7. The method according to claim 6, wherein the beam quality $M^2$ is between 1 and 1.4.

8. The method according to claim 1, wherein the laser radiation comprises multimode laser radiation.

9. The method according to claim 1, wherein the coating comprises polyamidimide, polyetheretherketone, and/or polyamidimide with polyimide film.

10. The method according to claim 1, wherein a beam cross section of the laser radiation has a Gaussian intensity profile and/or a top hat-shaped intensity profile.

11. The method according to claim 10, wherein the beam cross section of the laser radiation has the top hat-shaped intensity profile along a long extent and the Gaussian intensity profile along a short extent.

12. The method according to claim 1, wherein the laser radiation hatches a region of the conductor.

13. The method according to claim 12, wherein the laser radiation irradiates longitudinal ends of the hatched region using at least one single line transversely to a longitudinal extent of the conductor.

14. The method according to claim 1, wherein the laser radiation has the following parameters during the traversing for the first time:
- a fluence of at least 1 J/cm$^2$ and at most 40 J/cm$^2$; and
- a continuous laser beam or a pulsed laser beam with a repetition rate of at least 1 kHz and at most 4 MHz.

15. The method according to claim 1, wherein the laser radiation has the following parameters during the traversing for the second time:
- a fluence of at least 1 J/cm$^2$ and at most 40 J/cm$^2$; and
- a positive pulse overlap.

16. The method according to claim 1, wherein the method further comprising:
- traversing the conductor with the at least one laser beam for a third time to clean the conductor.

17. The method according to claim 1, wherein the pulse overlap is a negative pulse overlap of between −10% and −20%.

18. A method for stripping a rod-shaped conductor using laser radiation, wherein the rod-shaped conductor comprises an electrically conductive core and a coating that is at least partially transparent to the laser radiation, the method comprising:
- traversing the conductor for a first time with at least one laser beam to at least partially reduce transparency of the coating; and
- traversing the conductor for a second time with the at least one laser beam to at least partially reduce adhesion of the coating,
- wherein the laser radiation has the following parameters in order to obtain at least partial burning off of the coating:
  - a frequency of more than 20 kHz;
  - a pulse overlap of more than 40%;
  - a line overlap of more than 40%; and
  - a pulse energy of more than 40 mJ.

19. A method for producing a hairpin having two rod-shaped conductors, the method comprising:
- at least partially stripping a coating of a first rod-shaped conductor using a method according to claim 1 and/or at least partially stripping a coating of a second rod-shaped conductor using the method according to claim 1; and
- welding a free end of the first rod-shaped conductor to a free end of the second rod-shaped conductor.

* * * * *